United States Patent
Zafer et al.

(10) Patent No.: US 8,289,861 B2
(45) Date of Patent: Oct. 16, 2012

(54) SYSTEMS AND METHODS FOR MANAGING RESOURCES DURING HANDOFF ACROSS COMMUNICATION SYSTEMS HAVING DIFFERENT GRADES OF QUALITY OF SERVICE AWARENESS

(75) Inventors: Ali Asghar Zafer, San Diego, CA (US); Srinivasan Balasubramanian, San Diego, CA (US); Pavan Namburi, San Diego, CA (US); Shrawan Khatri, San Diego, CA (US); Srinivas Reddy Mudireddy, San Diego, CA (US); Sriram Nagesh Nookala, San Diego, CA (US); Venugopal Ramamurthy, San Diego, CA (US); Vipin A. Sali, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 631 days.

(21) Appl. No.: 11/501,452

(22) Filed: Aug. 8, 2006

(65) Prior Publication Data

US 2007/0223421 A1 Sep. 27, 2007

Related U.S. Application Data

(60) Provisional application No. 60/785,685, filed on Mar. 24, 2006.

(51) Int. Cl.
*H04L 1/00* (2006.01)
(52) U.S. Cl. ......... 370/252; 370/329; 370/328; 370/332
(58) Field of Classification Search .................. 370/252, 370/328, 329, 332
See application file for complete search history.

(56) References Cited

U.S. PATENT DOCUMENTS

| | | | |
|---|---|---|---|
| 7,200,154 B1 * | 4/2007 | Wu et al. ........................ | 370/468 |
| 7,236,787 B1 * | 6/2007 | Tamura et al. ................. | 455/437 |
| 7,308,263 B2 * | 12/2007 | Gallagher et al. ............. | 455/439 |
| 7,359,347 B2 * | 4/2008 | Ahmavaara et al. .......... | 370/328 |
| 7,500,015 B2 * | 3/2009 | Hiyama et al. ................ | 709/242 |
| 2001/0027490 A1 * | 10/2001 | Fodor et al. ................... | 709/238 |

(Continued)

FOREIGN PATENT DOCUMENTS

EP          1045600 A1    10/2000

(Continued)

OTHER PUBLICATIONS

Quality of Service (QoS) Feature for 1xEV-DO Revision A, 80-VB296-1-A, Mar. 3, 2006, pp. 1-83.

(Continued)

*Primary Examiner* — Wayne Cai
*Assistant Examiner* — Michael Irace
(74) *Attorney, Agent, or Firm* — Kevin T. Cheatham

(57) ABSTRACT

In a method for managing quality of service (QoS) resources during handoff across communication systems having different grades of QoS awareness, an access terminal (AT) determines that handoff has occurred from a QoS unaware system to a QoS aware system. The AT also determines whether there are any allocated, unrequested QoS resources. If one or more allocated, unrequested QoS resources are identified, the AT requests that the QoS aware system release the one or more allocated, unrequested QoS resources. The AT also determines whether there are any requested, unallocated QoS resources. If one or more requested, unallocated QoS resources are identified, the AT requests that the QoS aware system allocate the one or more requested, unallocated QoS resources to the application.

31 Claims, 13 Drawing Sheets

U.S. PATENT DOCUMENTS

| | | | |
|---|---|---|---|
| 2003/0039259 A1* | 2/2003 | Madour | 370/401 |
| 2003/0112766 A1* | 6/2003 | Riedel et al. | 370/252 |
| 2004/0037269 A1* | 2/2004 | Lundin | 370/352 |
| 2004/0198365 A1 | 10/2004 | Verma et al. | |
| 2004/0213198 A1* | 10/2004 | Mahmood et al. | 370/349 |
| 2004/0228304 A1* | 11/2004 | Riedel et al. | 370/332 |
| 2005/0096089 A1 | 5/2005 | Ishii et al. | |
| 2006/0222009 A1* | 10/2006 | Yao et al. | 370/469 |

FOREIGN PATENT DOCUMENTS

| | | |
|---|---|---|
| GB | 2406022 A1 | 3/2005 |
| JP | 2005142766 A | 6/2005 |
| JP | 2007515814 T | 6/2007 |
| JP | 2007529183 T | 10/2007 |
| WO | WO 2005015938 A1 | 2/2005 |
| WO | WO 2005089216 A2 | 9/2005 |

OTHER PUBLICATIONS

International Search Report-PCT/US07/064847, International Search Authority-European Patent Office-Aug. 6, 2007.

Written Opinion-PCT/US07/064847, International Search Authority-European Patent Office-Aug. 6, 2007.

Sungkwan Jun et al., "QoS based vertical handoff method between UMTS systems and wireless LAN networks," IEEE article.

* cited by examiner

SYSTEMS AND METHODS FOR MANAGING RESOURCES DURING HANDOFF ACROSS COMMUNICATION SYSTEMS HAVING DIFFERENT GRADES OF QUALITY OF SERVICE AWARENESS

CLAIM OF PRIORITY

This application claims priority to co-assigned U.S. Provisional Application No. 60/785,685, filed on Mar. 24, 2006, entitled "Handoff Optimizations."

TECHNICAL FIELD

The present disclosure relates generally to wireless communication systems. More specifically, the present disclosure relates to systems and methods for managing resources during handoff across communication systems having different grades of quality of service awareness.

BACKGROUND

Wireless communication systems are widely deployed to provide various communication services to wireless communication devices. A wireless communication device that receives services from a wireless communication system is sometimes referred to as an access terminal. Some examples of access terminals include cellular phones, wireless phones, laptop computers, wireless communication personal computer (PC) cards, personal digital assistants (PDAs), etc.

A wireless communication system is typically configured for electronic communication with an access terminal within a certain geographic area, which may be referred to as a coverage area of the wireless communication system. When the access terminal is located within the coverage area that is provided by a wireless communication system, a radio session may be established between the access terminal and the wireless communication system.

While a radio session is ongoing between an access terminal and a wireless communication system, the access terminal may move outside of the coverage area that is provided by that wireless communication system (the source system) and into the coverage area that is provided by another wireless communication system (the target system). When this occurs, the radio session that exists between the access terminal and the source system may be transferred to the target system. This process may be referred to as "handoff."

An access terminal may be utilized to obtain various communication services. Each service may be satisfactorily provided to the user by ensuring that a specified quality of service (QoS) is achieved for that service. QoS may be directed to bandwidth of the traffic channel, the scheduling of packet data, the scheduling of transmission packets over-the-air, delay sensitivity of the contents, or other factors that may be deemed relevant by a network carrier or service provider. QoS may be quantified by different parameters for different services. For example, a voice service may require a relatively stringent low delay and a certain minimum guaranteed data rate, whereas a packet data service may require a certain target packet error rate.

Not all wireless communication systems are capable of providing services at a specified QoS. A wireless communication system that is capable of providing services at a specified QoS may be referred to as a QoS aware system. Different QoS aware communication systems may have different levels of support for QoS. A wireless communication system that is not capable of providing services at a specified QoS may be referred to as a QoS unaware system. The present disclosure relates to techniques for managing QoS resources when handoff occurs across communication systems having different grades of quality of service awareness (e.g., from a QoS aware system to/from a QoS unaware system, between two QoS aware systems having different levels of support for QoS, etc.).

DETAILED DESCRIPTION

Figure 1:
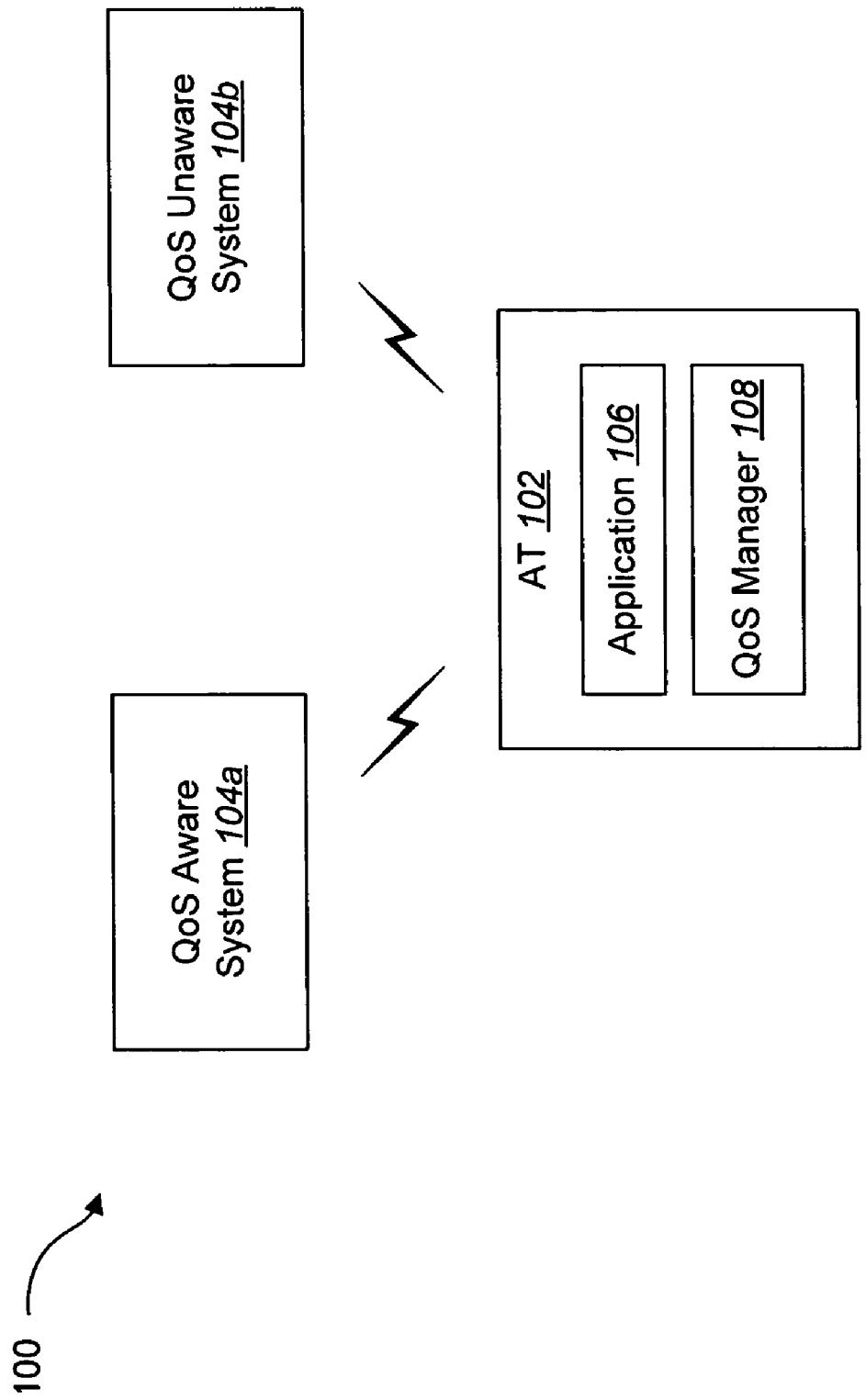
FIG. 1 illustrates a system in which embodiments may be practiced.

A method for managing quality of service (QoS) resources during handoff across communication systems having different grades of QoS awareness is disclosed. The method may be implemented by an access terminal. The method determines whether there are any allocated, unrequested QoS resources that are allocated to an application on the access terminal by a QoS aware system but that are not requested by the application. If one or more allocated, unrequested QoS resources are identified, the method requests that the QoS aware system release the one or more allocated, unrequested QoS resources. The method also determines whether there are any requested, unallocated QoS resources that are requested by the application but that are not allocated by the QoS aware system. If one or more requested, unallocated QoS resources are identified, the method requests that the QoS aware system allocate the one or more requested, unallocated QoS resources to the application.

In an embodiment, identifying the allocated, unrequested QoS resources and identifying the requested, unallocated QoS resources comprise comparing requested QoS resources information with allocated QoS resources information. The requested QoS resources information identifies requested QoS resources that are requested by an application on the access terminal. The allocated QoS resources information identifies allocated QoS resources that are allocated for the application. The requested QoS resources information and the allocated QoS resources information may be stored at the access terminal.

Requested QoS resources information may be updated in response to determining that the application has released requested QoS resources. Allocated QoS resources information may be updated in response to determining that the QoS aware system has released allocated QoS resources.

In an embodiment, requesting that the QoS aware system release the one or more allocated, unrequested QoS resources involves sending a traffic filter template (TFT) delete message to a packet data serving node in the QoS aware system. TFT refers to filter settings at the packet data serving node (PDSN). The filter settings include source/target IP address and port number and could also be based on DiffServ markings also. The IP packets arriving at the PDSN are filtered based on the priority ordered listing of the forward link (FL) filters in the TFT and the packets forwarded over the associated A10 connections to the radio access network (RAN). The A10 connection is associated with a radio link protocol (RLP) instance which gets the appropriate QoS treatment for over the air transmission to the mobile. The reverse link (RL) filters can be used change the DiffServ marking of the packets before they are sent over the Internet and may be used for billing purposes, e.g., measuring bytes sent, etc.

Requesting that the QoS aware system allocate the one or more requested, unallocated QoS resources may involve sending a TFT create message to a packet data serving node in the QoS aware system. In an embodiment, the TFT create message is sent to the packet data serving node only if it is determined that a point-to-point protocol (PPP) re-sync has not occurred since the access terminal was previously connected to any QoS aware system.

In response to determining that handoff has occurred from a QoS unaware system to the QoS aware system, the application may be notified that QoS operations may be resumed. In response to determining that handoff has occurred from the QoS aware system to a QoS unaware system, all QoS flows may be suspended.

An access terminal that is configured for managing quality of service (QoS) resources during handoff across communication systems having different grades of QoS awareness is also disclosed. The access terminal includes a transmitter for communicating with a QoS aware system and a QoS unaware system. The access terminal also includes a processor and memory in electronic communication with the processor. Instructions are stored in the memory. The instructions are executable to determine whether there are any allocated, unrequested QoS resources that are allocated to an application on the access terminal by the QoS aware system but that are not requested by the application. If one or more allocated, unrequested QoS resources are identified, the instructions are also executable to request that the QoS aware system release the one or more allocated, unrequested QoS resources. The instructions are also executable to determine whether there are any requested, unallocated QoS resources that are requested by the application but that are not allocated by the QoS aware system. If one or more requested, unallocated QoS resources are identified, the instructions are also executable to request that the QoS aware system allocate the one or more requested, unallocated QoS resources to the application.

A quality of service (QoS) aware system that is configured to facilitate management of QoS resources by an access terminal during handoff across communication systems having different grades of QoS awareness is also disclosed. The QoS aware system includes a transmitter for communicating with an access terminal. The QoS aware system also includes a processor and memory in electronic communication with the processor. Instructions are stored in the memory. The instructions are executable to receive a release request from the access terminal to release allocated, unrequested QoS resources that are allocated by the QoS aware system for an application on the access terminal but that are not requested by the application. The release request is sent by the access terminal in response to handoff occurring from a QoS unaware system to the QoS aware system. The instructions are also executable to release the allocated, unrequested QoS resources in response to receiving the release request. The instructions are also executable to receive an allocation request from the access terminal to allocate requested, unallocated QoS resources that are requested by the application on the access terminal but that are not allocated by the QoS aware system. The allocation request is sent by the access terminal in response to handoff occurring from the QoS unaware system to the QoS aware system. The instructions are also executable to allocate the requested, unallocated QoS resources to the application in response to receiving the allocation request.

Various embodiments of the disclosure are now described with reference to the Figures, where like reference numbers indicate identical or functionally similar elements. The embodiments of the present disclosure, as generally described and illustrated in the Figures herein, could be arranged and designed in a wide variety of different configurations. Thus, the following detailed description of several embodiments of the present disclosure, as represented in the Figures, is not intended to limit the scope of the disclosure, as claimed, but is merely representative of the embodiments of the disclosure.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments of the disclosed disclosure(s)," unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

FIG. 1 illustrates a system 100 in which embodiments may be practiced. The system 100 includes an access terminal 102. The access terminal 102 may be a cellular phone, a wireless phone, a wired phone, a laptop computer, a wireless communication personal computer (PC) card, a personal digital assistant (PDA), an external or internal modem, etc. Other names for the access terminal 102 include an access unit, a subscriber unit, a mobile station, a mobile device, a mobile unit, a mobile phone, a remote station, a remote terminal, a remote unit, a user device, user equipment, a handheld device, etc.

When the access terminal 102 is located within the coverage area of a QoS aware system 104a, a radio session may be established between the access terminal 102 and the QoS aware system 104a. At some point, the access terminal 102 may move outside of the coverage area that is provided by the QoS aware system 104a and into the coverage area that is provided by a QoS unaware system 104b. When this occurs, the radio session that exists between the access terminal 102 and the QoS aware system 104a may be transferred to the QoS unaware system 104b. As indicated above, this process may be referred to as handoff from the QoS aware system 104a to the QoS unaware system 104b. Handoff may also occur from the QoS unaware system 104b to the QoS aware system 104a.

Embodiments disclosed herein relate generally to managing QoS resources when handoff occurs across QoS aware and QoS unaware communication systems. One aspect of managing QoS resources relates to facilitating the release of QoS resources that have been allocated by a QoS aware system 104a while the access terminal 102 is receiving service from a QoS unaware system 104b. For example, while a radio session is ongoing between the access terminal 102 and the QoS aware system 104a, an application 106 on the access terminal 102 may request certain QoS resources from the QoS aware system 104a, and the QoS aware system 104a may allocate the requested QoS resources to the application 106. Sometime thereafter, handoff of the radio session may occur from the QoS aware system 104a to the QoS unaware system 104b. While the access terminal 102 is receiving service from the QoS unaware system 104b, it may be desirable for the application 106 to be able to release all of the QoS resources that have been allocated to it by the QoS aware system 104a.

Figure 2:
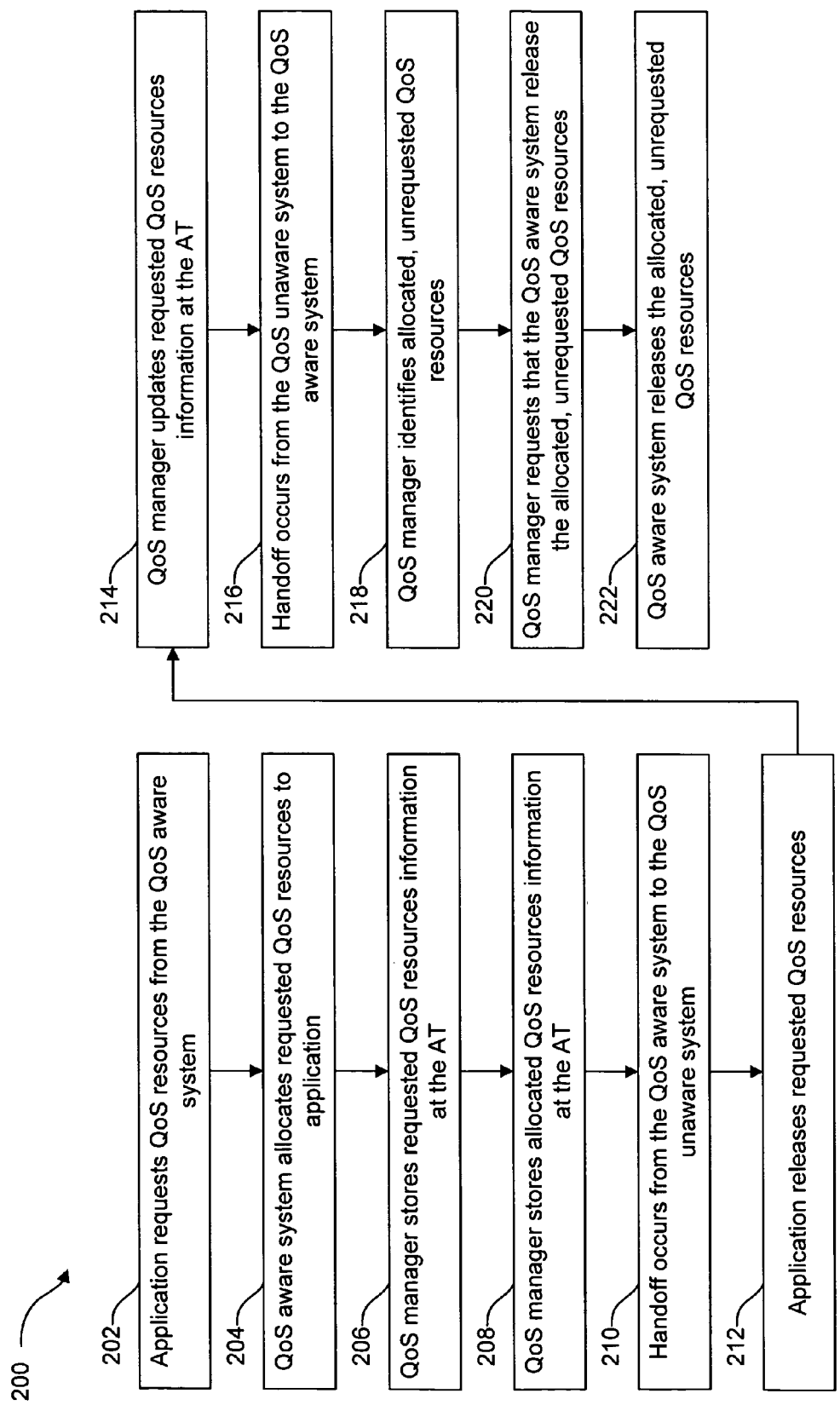
FIG. 2 illustrates a method for facilitating release of QoS resources while receiving service from a QoS unaware system in accordance with an embodiment.

FIG. 2 illustrates a method 200 for facilitating release of QoS resources while receiving service from a QoS unaware system 104b in accordance with an embodiment. The method 200 may be implemented by the various components in the system 100 shown in FIG. 1.

In the depicted method 200, while a radio session is ongoing between the access terminal 102 and the QoS aware system 104a, the application 106 requests 202 one or more QoS resources from the QoS aware system 104a. The resources that are requested by the application 106 will be referred to as requested QoS resources. In response to the application's 106 request, the QoS aware system 104a allocates 204 the requested QoS resources to the application 106. The resources that are allocated by the QoS aware system 104a will be referred to as allocated QoS resources.

A QoS management component 108 on the access terminal 102 (which may be referred to simply as a QoS manager 108) stores 206 information at the access terminal 102 which identifies the requested QoS resources (i.e., the QoS resources that are requested by the application 106). This information will be referred to as requested QoS resources information. The QoS manager 108 also stores 208 information at the access terminal 102 which identifies the allocated QoS resources (i.e., the QoS resources that are allocated by the QoS aware system 104a). This information will be referred to as allocated QoS resources information.

At some point thereafter, handoff occurs 210 from the QoS aware system 104a to the QoS unaware system 104b. While the access terminal 102 is receiving service from the QoS unaware system 104b, the application 106 may release (i.e., stop requesting) some or all of the requested QoS resources. The application 106 may release requested QoS resources in response to the user of the access terminal 102 shutting down the application 106. If the application 106 does release 212 the requested QoS resources, the QoS manager 108 updates 214 the requested QoS resources information at the access terminal 102 to reflect the fact that the requested QoS resources have been released by the application 106. However, because the access terminal 102 is receiving service from the QoS unaware system 104b when the application 106 releases 212 the requested QoS resources, the QoS aware system 104a may not release the allocated QoS resources even though the application 106 has released the requested QoS resources.

At some point thereafter, handoff may occur 216 from the QoS unaware system 104b back to the QoS aware system 104a (or, alternatively, to a different QoS aware system). In response, the QoS manager 108 compares the requested QoS resources information that is stored at the access terminal 102 with the allocated QoS resources information that is stored at the access terminal 102. As a result of making this comparison, the QoS manager 108 identifies 218 QoS resources that are allocated by the QoS aware system 104a but that are not requested by the application 106 (because they were previously released by the application 106 when the access terminal 102 was receiving service from the QoS unaware system 104b). These QoS resources will be referred to as allocated, unrequested QoS resources. In response to identifying 218 allocated, unrequested QoS resources, the QoS manager 108 requests 220 that the QoS aware system 104a release the allocated, unrequested QoS resources. In response to receiving such a request from the QoS manager 108, the QoS aware system 104a releases 222 the allocated, unrequested QoS resources.

Another aspect of managing QoS resources relates to automatic restoration of QoS resources when handoff occurs from a QoS unaware system 104b to a QoS aware system 104a. For example, referring again to the system 100 that is shown in FIG. 1, when handoff occurs from the QoS aware system 104a to the QoS unaware system 104b, the QoS aware system 104a may release some or all of the allocated QoS resources (i.e., QoS resources that have been allocated to the application 106). At some point thereafter, handoff may occur from the QoS unaware system 104b back to the QoS aware system 104a (or, alternatively, to a different QoS aware system). When this occurs, it may be beneficial for the previously allocated QoS resources to be automatically restored to the application 106.

Figure 3:
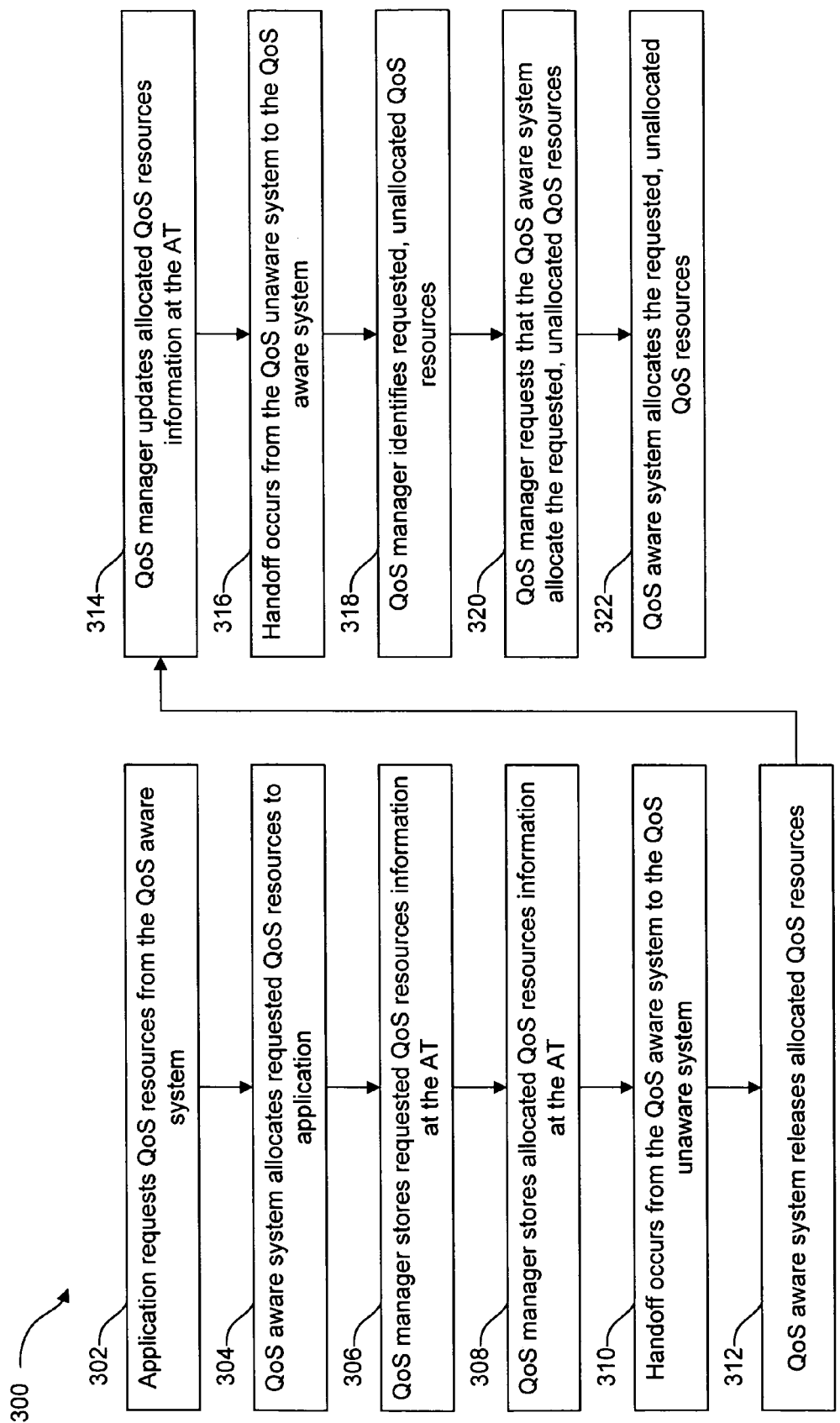
FIG. 3 illustrates a method for facilitating automatic restoration of QoS resources in accordance with an embodiment.

FIG. 3 illustrates a method 300 for facilitating automatic restoration of QoS resources in accordance with an embodiment. The method 300 may be implemented by the various components in the system 100 shown in FIG. 1.

Some of the steps 302, 304, 306, 308 in the method 300 of FIG. 3 are similar to some of the steps 202, 204, 206, 208 in the method 200 of FIG. 2. In particular, while a radio session is ongoing between the access terminal 102 and the QoS aware system 104a, the application 106 requests 302 one or more QoS resources from the QoS aware system 104a. The resources that are requested by the application 106 will be referred to as requested QoS resources. In response to the application's 106 request, the QoS aware system 104a allocates 304 the requested QoS resources to the application 106. The resources that are allocated by the QoS aware system 104a will be referred to as allocated QoS resources.

The QoS manager 108 stores 306 information at the access terminal 102 which identifies the requested QoS resources (i.e., the QoS resources that are requested by the application 106). This information will be referred to as requested QoS resources information. The QoS manager 108 also stores 308 information at the access terminal 102 which identifies the allocated QoS resources (i.e., the QoS resources that are allocated by the QoS aware system 104a). This information will be referred to as allocated QoS resources information.

At some point thereafter, handoff occurs 310 from the QoS aware system 104a to the QoS unaware system 104b. When the handoff occurs 310, the QoS aware system 104a may release (i.e., stop allocating) the allocated QoS resources. If the QoS aware system 104a does release 312 the allocated QoS resources, the QoS manager 108 updates 314 the allocated QoS resources information at the access terminal 102 to reflect the fact that the allocated QoS resources have been released by the QoS aware system 104a.

At some point thereafter, handoff may occur 316 from the QoS unaware system 104b back to the QoS aware system 104a (or, alternatively, to a different QoS aware system). In response, the QoS manager 108 compares the requested QoS resources information that is stored at the access terminal 102 with the allocated QoS resources information that is stored at the access terminal 102. As a result of making this comparison, the QoS manager 108 identifies 318 QoS resources that are requested by the application 106 but that are not allocated by the QoS aware system 104a. These QoS resources will be referred to as requested, unallocated QoS resources. In response to identifying 318 requested, unallocated QoS resources, the QoS manager 108 requests 320 that the QoS aware system 104a allocate the requested, unallocated QoS resources to the application 106. In response to receiving such a request from the QoS manager 108, the QoS aware system 104a allocates 322 the requested, unallocated QoS resources to the application 106.

As indicated above, the methods 200, 300 may be implemented by a QoS manager 108, which may be separate from the application 106. Consequently, the application 106 is shielded from the details of allocating/releasing QoS resources when moving across QoS aware and QoS unaware systems 104a, 104b.

Figure 4:
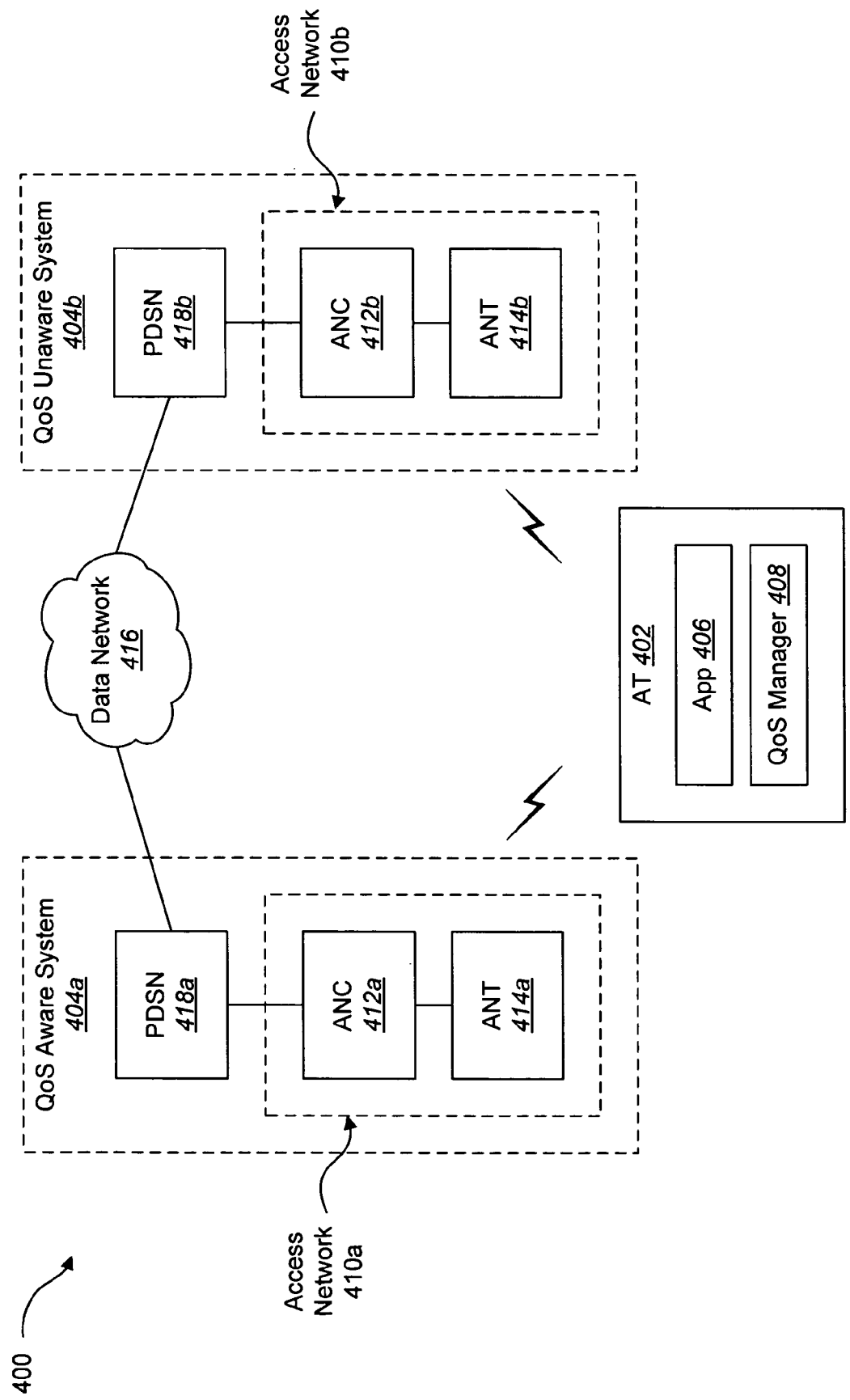
FIG. 4 illustrates another system in which embodiments may be practiced.

FIG. 4 illustrates another system 400 in which embodiments may be practiced. The system 400 includes an access terminal 402. An application 406 is running on the access terminal 402. In addition, a QoS manager 408 is running on the access terminal 402.

When the access terminal 402 is located within the coverage area of a QoS aware system 404a, a radio session may be established between the access terminal 402 and the QoS aware system 404a. Handoff may occur from the QoS aware system 404a to a QoS unaware system 404b. Handoff may also occur from the QoS unaware system 404b to the QoS aware system 404a.

The QoS aware system 404a includes an access network 410a, which includes an access network controller 412a and an access network transceiver 414a. The access network controller 412a interfaces with a data network 416 (e.g., a packet data network) via a packet data serving node (PDSN) 418a. The access network controller 412a may be configured to route data packets between the access terminal 402 and the data network 416. Additionally, the access network controller 412a may be configured to perform various radio access and link maintenance functions (such as handoff), control radio transmitters and receivers (e.g., the access network transceiver 414a), and so on.

The access network controller 412a may alternatively be referred to as a base station controller. The access network transceiver 414a may alternatively be referred to as a base-station transceiver system, an access point, a modem pool transceiver, a Node B (e.g., in a W-CDMA type system), etc.

The QoS unaware system 404b also includes an access network 410b, which includes an access network controller 412b and an access network transceiver 414b. The access network controller 412b interfaces with the data network 416 via a PDSN 418b. These components 410b, 412b, 414b, 418b function similarly to the corresponding components 410a, 412a, 414a, 418a in the QoS aware system 404a.

A QoS configuration for the QoS aware system 404a shown in FIG. 4 may consist of two entities: air link QoS and filter specifications. The air link QoS refers to a link between the access terminal 402 and the access network transceiver 414a. It is a last hop or last mile of end-to-end communication. However, the air link QoS only commits physical resources for incoming data. It does not tag which data has what kind of QoS requirements. This tagging of data is achieved through filter specifications. The filter specifications at the PDSN 418a are used to tag the incoming data traffic with appropriate QoS treatment characteristics. Hence, when a stream of data arrives at the PDSN 418a, it is tagged with appropriate QoS guarantees. This tagging happens by mapping the stream of data onto one of the established A10/A11 links between the PDSN 418a and the access network 410a. The stream of data is then sent to the access network transceiver 414a by queuing it on an appropriate radio link protocol (RLP) instance. There are multiple RLP instances between the access network 410a and the access terminal 402. One of these instances is default (i.e. no QoS treatment). Other RLP instances are associated with QoS profiles (i.e., appropriate QoS treatment characteristics negotiated between the access terminal 402 and the access network 410a).

When the access terminal 402 moves from the QoS aware system 404a to the QoS unaware system 404b, there are two possible scenarios. In the first scenario, the PPP link between the access terminal 402 and the PDSN 418 is re-synced (i.e. re-established). This may happen if the two serving PDSNs 418a, 418b are different (as shown in FIG. 4). In this scenario, the PDSN 418 would delete all filter specifications. If the PDSN 418 deletes these filter specifications, one of the links for guaranteeing QoS treatment is deleted. Hence, when the access terminal 402 moves back to the QoS aware system 404a, it re-installs these filters to provide seamless privileged connectivity to the end-users. As discussed above, this may be achieved by maintaining the view of the PDSN's 418 state across the QoS aware and QoS unaware systems 404a, 404b and taking appropriate action by looking at the disparity between the user's QoS request, the PDSN's 418 state, and the current capabilities of the cellular network.

In the second scenario, the PPP link between the access terminal 402 and the PDSN 418 is not re-synced. This may happen if the same PDSN 418 serves the access network transceiver 414a in the QoS aware system 404a and the access network transceiver 414b in the QoS aware system 404b (this is not the case in FIG. 4).

In the system 400 shown in FIG. 4, the QoS resources at the access network 410a are, among other things, mapping from flow labels to QoS profiles. The QoS resources at the PDSN 418a are filter specifications and mapping between these filters to the A10/A11 physical links.

Figure 5:
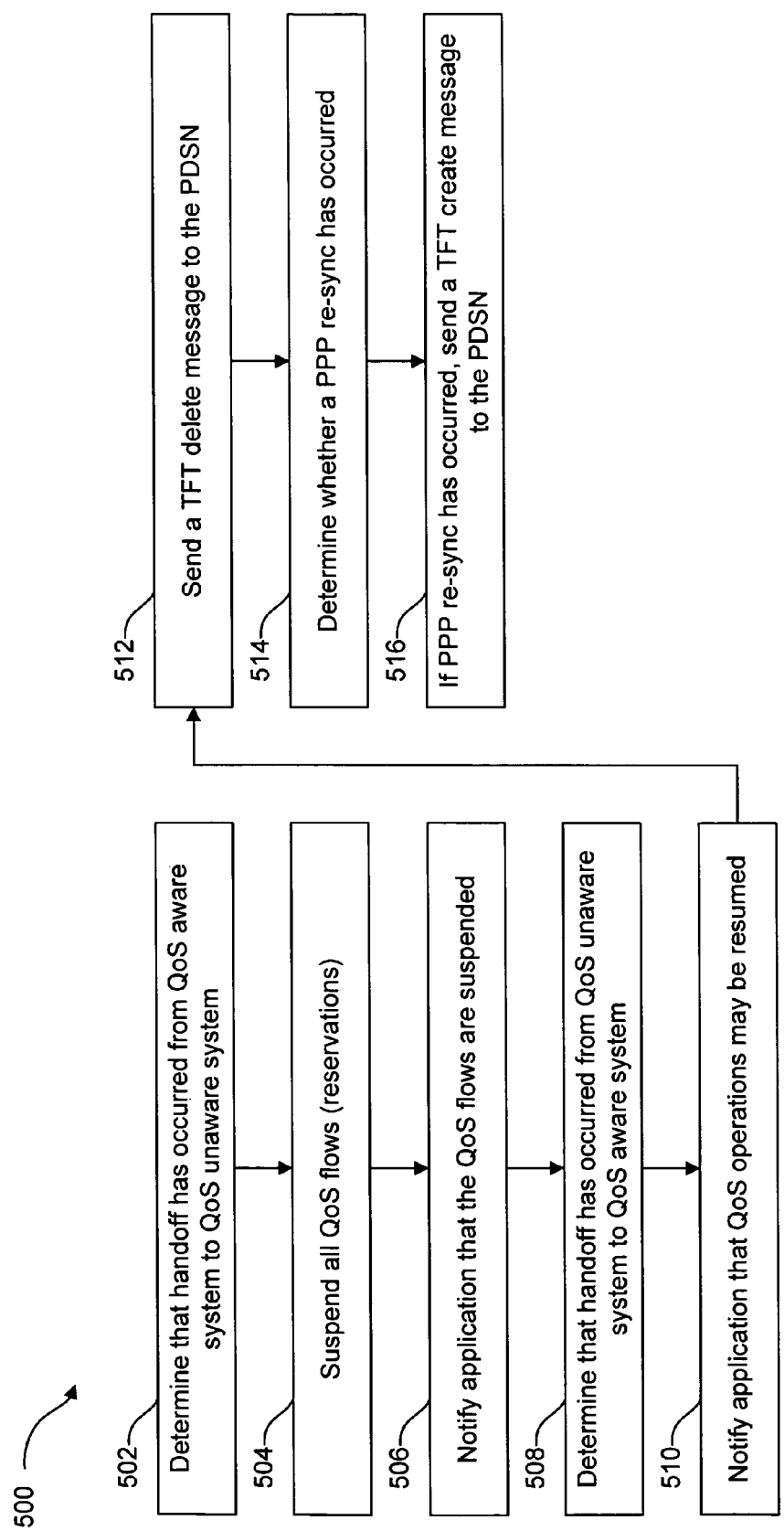
FIG. 5 illustrates another method for managing quality of service (QoS) resources across QoS aware and QoS unaware communication systems in accordance with an embodiment.

FIG. 5 illustrates another method 500 for managing quality of service (QoS) resources across QoS aware and QoS unaware communication systems in accordance with an embodiment. The method 500 may be implemented by the QoS manager 408 on the access terminal 402 in the system 400 that is shown in FIG. 4.

At some point, handoff may occur from the QoS aware system 404a to the QoS unaware system 404b. In the depicted method 500, when the QoS manager 408 determines 502 that handoff has occurred from the QoS aware system 404a to the QoS unaware system 404b, the QoS manager 408 suspends 504 all QoS flows (reservations) and notifies 506 the application 406 that the QoS flows are suspended. The QoS manager 408 does not allow the application 406 to perform any QoS related operations (except to release the QoS) while receiving service from the QoS unaware system 404b.

When the access terminal 402 is in the QoS unaware system 404b, the QoS manager 408 may reject QoS requests and expect the application 408 to retry when the access terminal 402 is in a QoS aware system 404a. Alternatively, the QoS manager 408 may archive QoS requests from the application 408 and place the QoS requests when the access terminal 402 enters a QoS aware system 404a.

At some point, handoff may occur from the QoS unaware system 404b to the QoS aware system 404a. When the QoS manager 408 determines 508 that handoff has occurred from the QoS unaware system 404b to the QoS aware system 404a, the QoS manager 408 notifies 510 the application 406 that QoS operations may be resumed. The QoS manager 408 also sends 512 a TFT delete message to the PDSN 418a in the QoS aware system 404a. The TFT delete message contains flows for which QoS was released while the access terminal 402 was receiving service from the QoS unaware system 404b.

The QoS manager 408 also determines 514 whether a PPP re-sync has occurred since the access terminal 402 was previously connected to any QoS aware system (either the QoS aware system 404a that is involved in the handoff or a different QoS aware system). If the QoS manager 408 determines 514 that a PPP re-sync has occurred, this means that there are no filter specifications installed at the PDSN 418a for the valid flows for which QoS is still established. Consequently, the QoS manager 408 sends 516 a TFT create message to the PDSN 418a in the QoS aware system 404a. The TFT create message contains all the valid flows for which QoS is still established.

If the QoS manager 408 determines 514 that a PPP re-sync has not occurred, then it is not necessary for the filter specifications to be re-installed at the PDSN 418a. Consequently, the QoS manager 408 does not send a TFT create message to the PDSN 418a in the QoS aware system 404a. Instead, it is simply assumed that the PDSN 418a will automatically start filtering packets based on the filter specifications that are already installed at the PDSN 418a.

The method 500 of FIG. 5 illustrates how some aspects of the methods 200, 300 that are shown in FIGS. 2-3 may be implemented. For example, in the method 200 of FIG. 2, in response to identifying 218 allocated, unrequested QoS resources, the QoS manager 108 requests 220 that the QoS aware system 104a release the allocated, unrequested QoS resources. The step of requesting 220 that the QoS aware system 104a release the allocated, unrequested QoS resources is implemented in the method 500 of FIG. 5 by sending 512 a TFT delete message to the PDSN 418a in the QoS aware system 104a. As indicated above, the TFT delete message contains flows for which QoS was released while the access terminal 402 was receiving service from the QoS unaware system 404b.

As another example, in the method 300 of FIG. 3, in response to identifying 318 requested, unallocated QoS resources, the QoS manager 108 requests 320 that the QoS aware system 104a allocate the requested, unallocated QoS resources to the application 106. The step of requesting 320 that the QoS aware system 104a allocate the requested, unallocated QoS resources to the application 106 is implemented in the method 500 of FIG. 5 by sending 516 a TFT create message to the PDSN 418a in the QoS aware system 404a. As indicated above, the TFT create message contains all the valid flows for which QoS is still established.

Figure 6A:
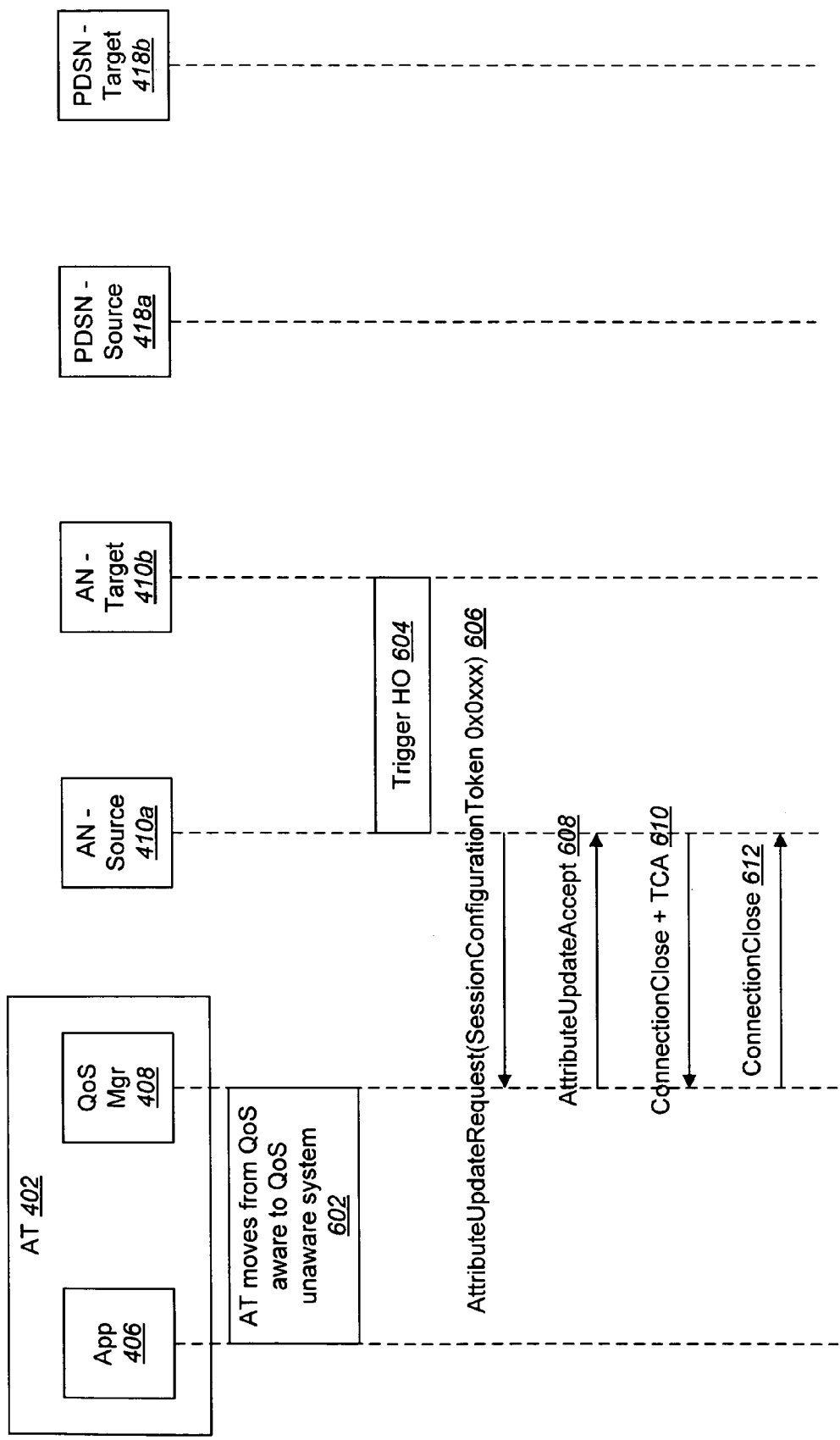
FIGS. 6A-6C illustrate operation of the various components in the system of FIG. 4 during handoff from the QoS aware system to the QoS unaware system in accordance with an embodiment.
Figure 6B:
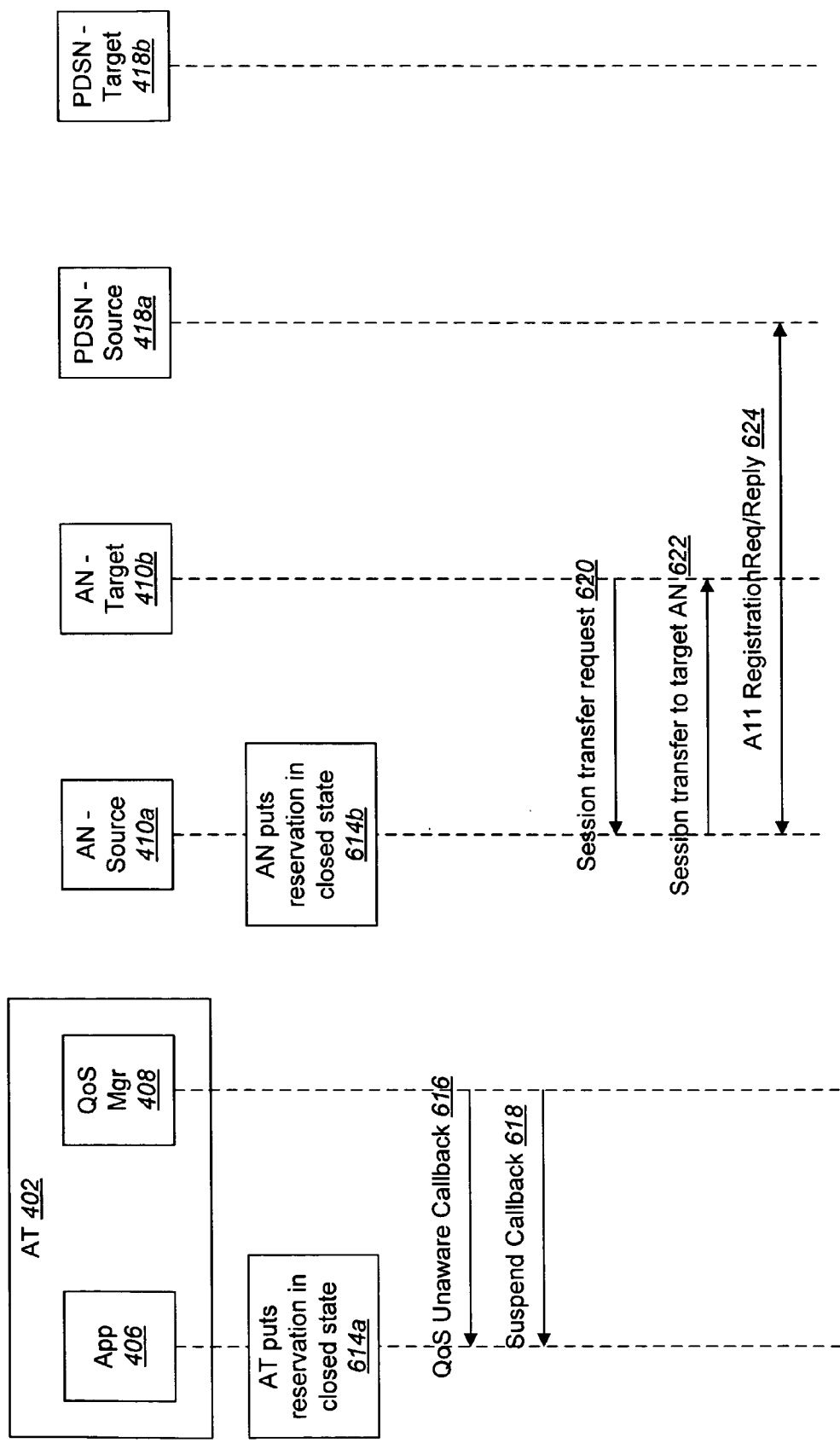
Figure 6C:
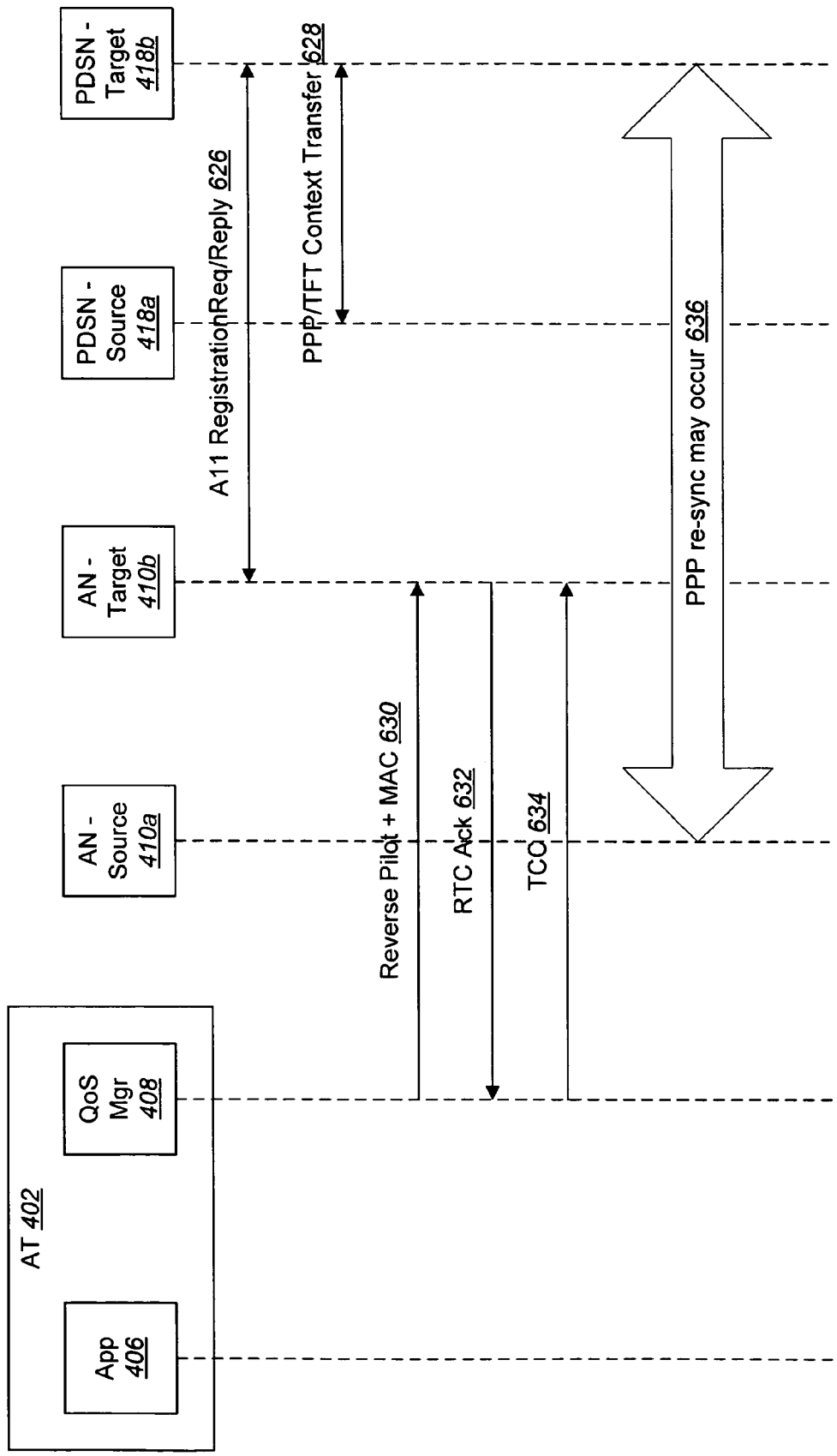

FIGS. 6A-6C illustrate operation of the access terminal 402 (including the application 406 and the QoS manager 408), the access network 410a and the PDSN 418a in the QoS aware system 404a, and the access network 410b and the PDSN 418b in the QoS unaware system 404b during handoff from the QoS aware system 404a to the QoS unaware system 404b in accordance with an embodiment.

Referring to FIG. 6A, when the access terminal 402 moves 602 from the QoS aware system 404a to the QoS unaware system 404b, the access network 410a in the QoS aware system 404a (the source access network 410a) and the access network 410b in the QoS unaware system 404b (the target access network 410b) trigger 604 a handoff. The source access network 410a sends 606 the TrafficChannelAssignment and the AttributeUpdateRequest changing the access terminal 402 to a personality with SessionConfigurationToken=0x0xxx supported by the target access network 410b. The access terminal 402 sends 608 the AttributeUpdateAccept. The source access network 410a closes 610 the connection by sending ConnectionClose to the QoS manager 408. The source access network 410a also bundles the TrafficChannelAssignment message allocating the traffic channels in the target access network 410b. The QoS manager 408 sends 612 ConnectionClose to the source access network 410a and proceeds to acquire the target access network 410b.

Referring to FIG. 6B, both the source access network 410a and the access terminal 402 put 614a, 614b the reservations in a closed state as the personality change occurs on a connection release. Note that for the source access network 410a, it is only a recommendation so that the states at the access terminal 402 and the source access network 410a remain consistent as the access terminal 402 moves from the QoS aware system 404a to the QoS unaware system 404b.

The QoS unaware notification is provided 616 to the application 406 by the QoS manager 406. The suspend notification is provided 618 to the application 406 by the QoS manager 406 for reservations to be transitioned to the closed state. Note that calling the QoS flow activation request after this will return an error.

The target access network 410b requests 620 the transfer of the session from the source access network 410a. The source access network 410a provides 622 the access terminal's 402 session information to the target access network 410b. The source access network 410a releases 624 the A10 connection from the source PDSN 418a. Referring to FIG. 6C, the target access network 410b establishes 626 the A10 connection with the target PDSN 418b. If the PPP/TFT/Filter context can be transferred, the source PDSN 418a performs 628 this context transfer to the target PDSN 418b.

The access terminal 402 transmits 630 the pilot and DRC over the reverse link. Note that steps 620, 622, 624, 626, 628, 630 may happen in parallel with step 610.

The target access network 410b acquires the access terminal 402 and transmits 632 the RTC Ack. The access terminal 402 sends 634 the TrafficChannelComplete completing the connection setup with the target access network 410b. If the PPP context cannot be transferred, the PPP re-sync is initiated 636 by the target PDSN 418b. In the depicted method the access terminal 402 does not create a TFT or install any filters at the target PDSN 418b in response to the PPP re-sync, since the target system 404b is not capable of providing a different QoS for different flows.

FIGS. 7A-7D illustrate operation of the access terminal 402 (including the application 406 and the QoS manager 408), the access network 410b and the PDSN 418b in the QoS unaware system 404b, and the access network 410a and the PDSN 418a in the QoS aware system 404a during handoff from the QoS unaware system 404b to the QoS aware system 404a in accordance with an embodiment.

Figure 7A:
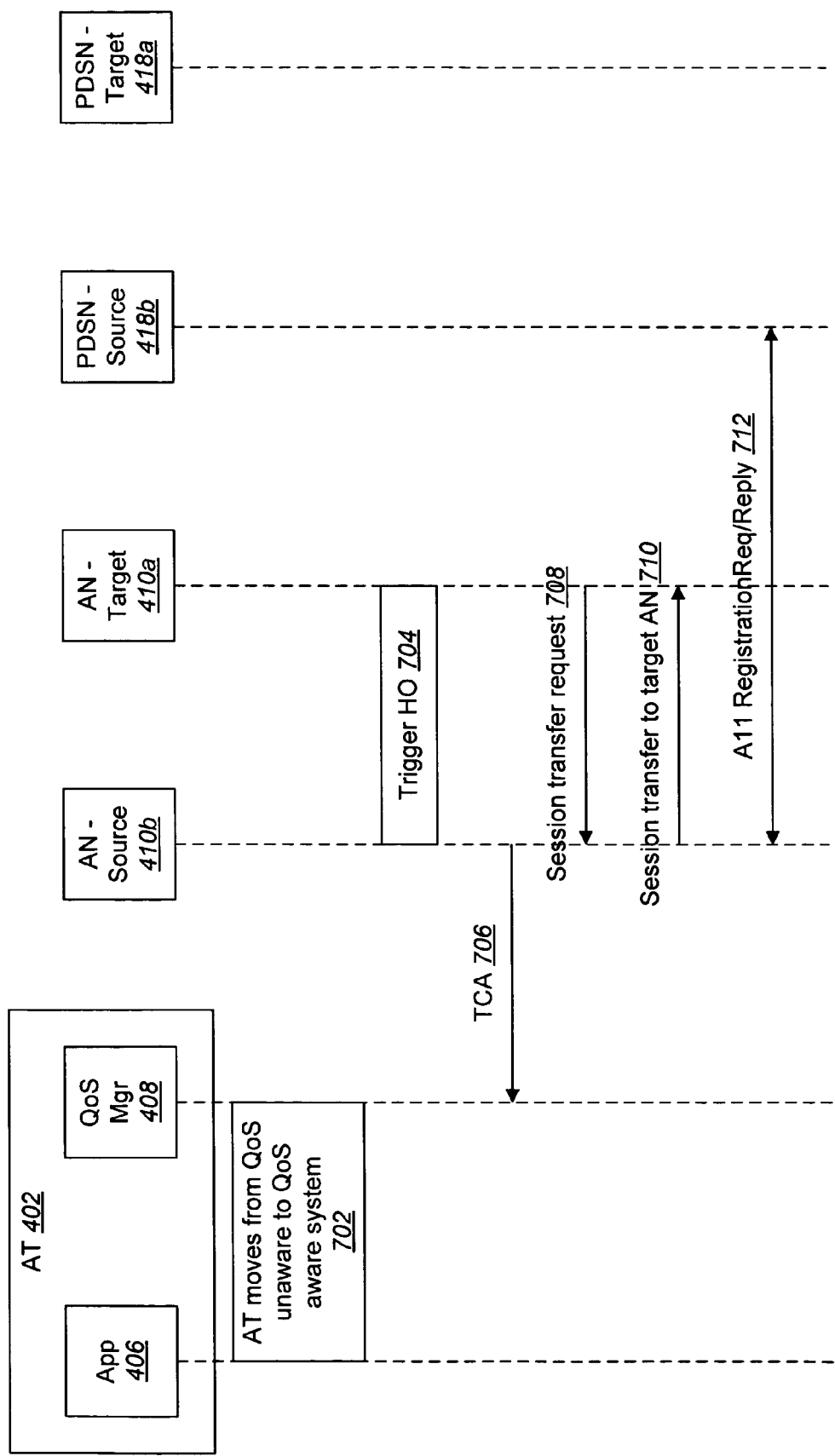
FIGS. 7A-7D illustrate operation of the various components in the system of FIG. 4 during handoff from the QoS unaware system to the QoS aware system in accordance with an embodiment.

Referring to FIG. 7A, when the access terminal 402 moves 702 from the QoS unaware system 404b to the QoS aware system 404a, the access network 410b in the QoS unaware system 404b (the source access network 410b) and the access network 410a in the QoS aware system 404a (the target access network 410a) trigger 704 a handoff. The source access network 410b sends 706 the TrafficChannelAssignment to the access terminal 402. The access terminal 402 is transferred to the target access network 410a with the current personality.

Figure 7B:
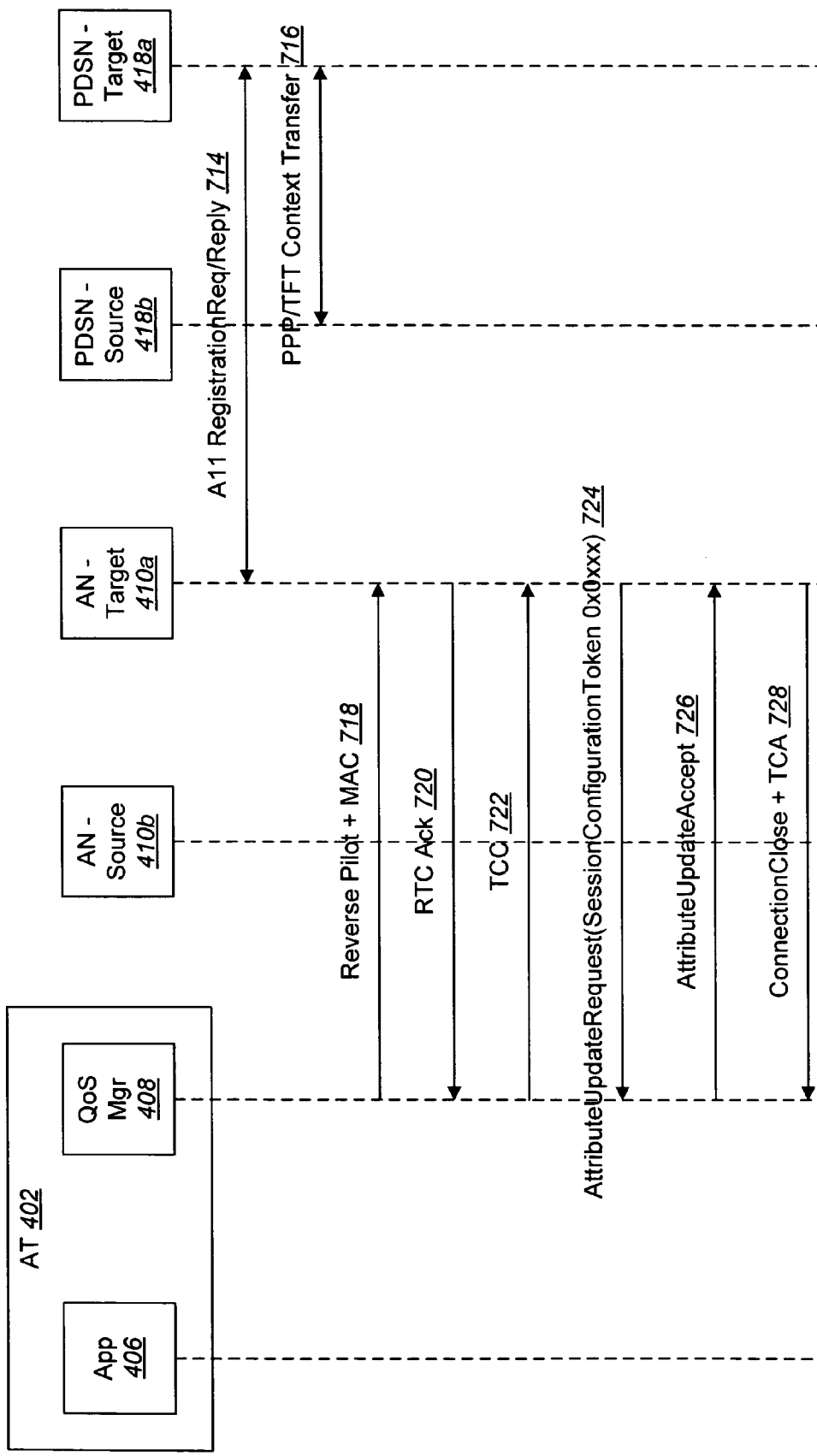

The target access network 410a requests 708 transfer of the session from the source access network 410b. The source access network 410b provides 710 the access terminal's 402 session information to the target access network 410a. The source access network 410b releases 712 the A10 connection from the source PDSN 418b. Referring to FIG. 7B, the target access network 410a establishes 714 the A10 connection with the target PDSN 418a.

The PPP/TFT/Filter context, if possible, is acquired 716 at the target PDSN 418a. The access terminal 402 transmits 718 the pilot and DRC over the reverse link. The target access network 410a acquires the reverse link and transmits 720 the RTC Ack. Note that the access terminal 402 is still operating with the Rev 0 personality.

The access terminal 402 sends 722 the TrafficChannelComplete completing the connection setup with the target access network 410a. The target access network 410a sends 724 the AttributeUpdateRequest switching the session configuration token to 0x1xxx. The access terminal 402 sends 726 the AttributeUpdateAccept. The target access network 410a sends 728 a ConnectionClose and a TrafficChannelAssignment to facilitate switching of personalities.

Figure 7C:
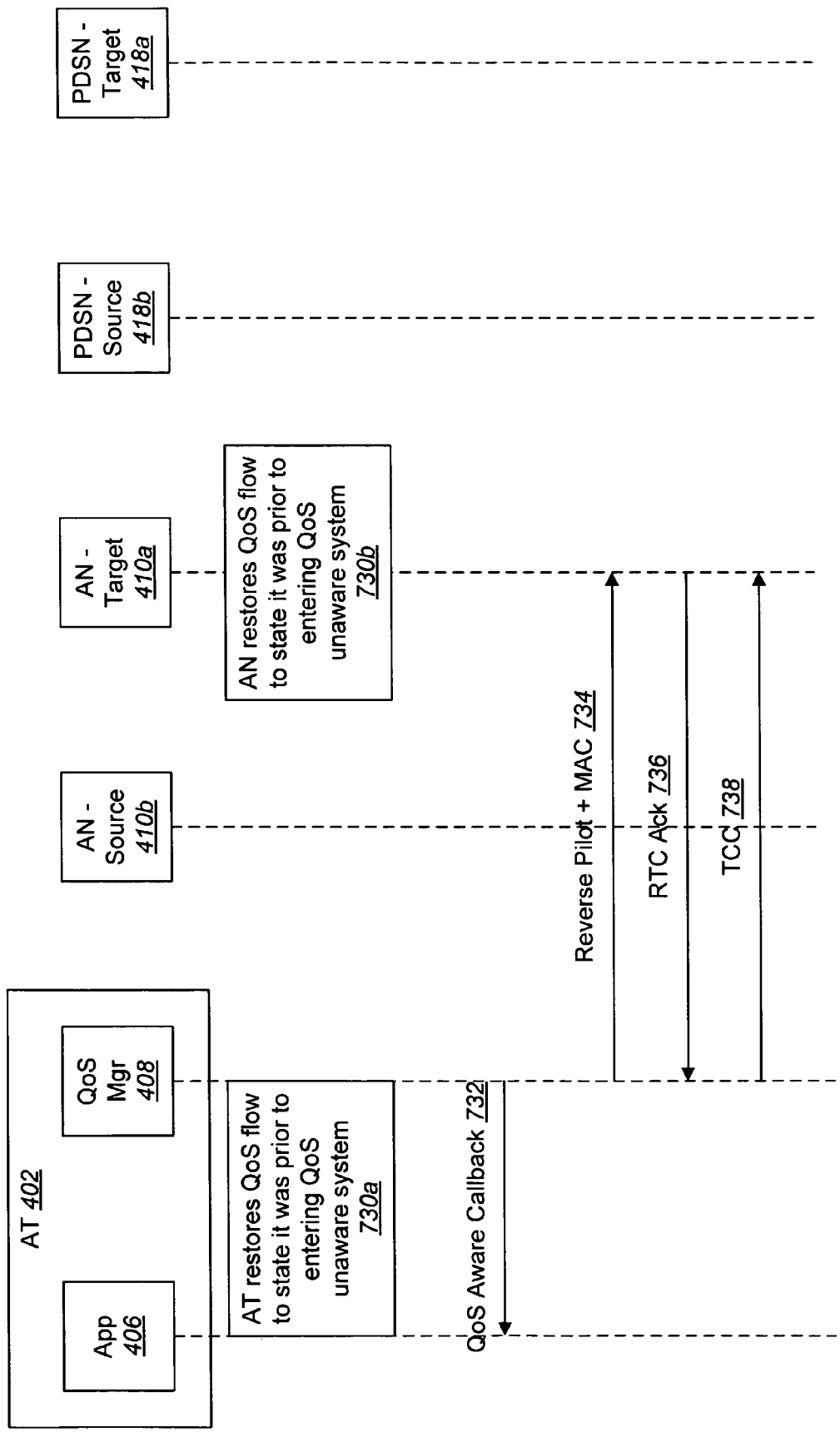

Referring to FIG. 7C, both the access terminal 402 and the target access network 410a restore 730a, 730b the reservations to the state they were when the access terminal 402 last transitioned out of the QoS aware system 404a. Note that all the reservations are put in the closed state when the access terminal 402 transitions out of the QoS aware system 404a. A QoS aware notification is provided 732 to the application 406 by the QoS manager 408.

The access terminal 402 transmits 734 the pilot and DRC over the reverse link. The access terminal 402 is now in a Rev-A personality. The target access network 410a acquires the reverse link and transmits 736 the RTC Ack. The access terminal 402 sends 738 the TrafficChannelComplete completing the connection setup with the target access network 410a.

Figure 7D:
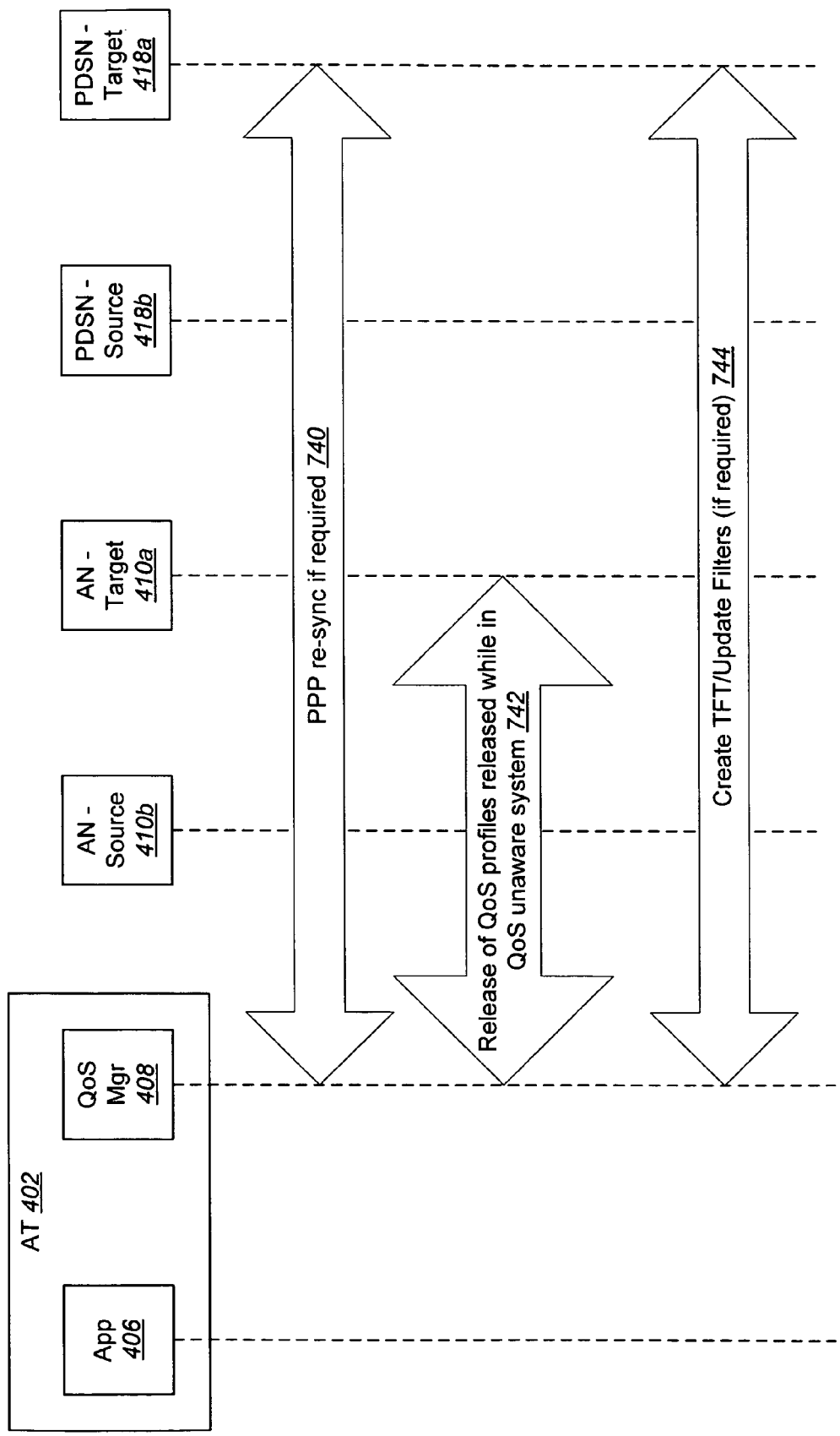

Referring to FIG. 7D, the PPP re-sync, if required, is initiated 740 by the target PDSN 418a. If QoS applications were closed while in the QoS unaware system 404b, the QoS manager 408 releases 742 these reservations after it re-enters the QoS aware system 404a. The QoS manager 408 retains the information and releases the QoS profiles after entering the QoS aware system 404a.

The access terminal 402 determines if a PPP re-sync had occurred while on the QoS unaware system 404b. If a PPP re-sync had occurred, the access terminal 402 creates 744 the TFT and updates the filters at the target PDSN 418a.

If a PPP re-sync had occurred, it means that there are no filters installed at the target PDSN 418a for the QoS flows. The access terminal 402 will thus send a TFT containing all the valid flows for which QoS is still established. (This will not include those flows for which QoS had been released while on the QoS unaware system 404b.) In addition, the access terminal 402 will also send ReservationKKQoSRequest messages with ProfileType=NULL to release all the flows (reservations) for which QoS was released while on the QoS unaware system 404b.

If no PPP re-sync occurred either on the handoff from the QoS aware system 404a to the QoS unaware system 404b, or from the QoS unaware system 404b back to the QoS aware system 404a, then the access terminal 402 does not need to re-install filters at the target PDSN 418a, and will not send a TFT create message. It is assumed that the target PDSN 418a will automatically start filtering packets based on an existing TFT after the handoff back to the QoS aware system 404a. The access terminal 402 deletes any flows for which QoS has been released while on the QoS unaware system 404b. The access terminal 402 sends a TFT create message including only the filters to be retained. This will result in removing the filter entries for which the application 406 released the QoS profiles while ensuring the consistency of the retained filters. Simultaneously, the access terminal 402 will also send ReservationKKQoSRequest with ProfileType=0 to inform the target access network 410a to release these reservations.

In an embodiment, the access terminal 402 may maintain the context of the QoS and suspend the information while in a QoS unaware system 404b. The access terminal 402 may reactivate the context when the access terminal 402 reenters a QoS aware system 404a.

In an embodiment, the transition to 1× may be treated as a transition to a QoS unaware region. Several types of QoS awareness may be provided, each depending on the type of QoS support provided. Each of these may be addressed through independent access terminal 402 personalities. As an access terminal 402 transitions through QoS regions, the QoS capability at the access terminal 402 may depend on the current personality that the access network 410 activates. The appropriate notifications (QoS aware to the right applications 406, allowing the reservations to be turned on for those applications 406) may be provided to the applications 406.

The embodiments disclosed herein may provide several benefits over conventional approaches. For example, one benefit may be instantaneous restoration of service since message exchange is avoided in common scenarios. Another benefit may be that applications 406 are ignorant about all the messaging, and are therefore provided with seamless access to QoS resources. Another benefit may be that the air interface messaging may be optimized since under some circumstances the sending of potentially large TFTs to the PDSN 418 may be avoided. Another benefit may be that interruption of service is minimized unless on an unaware radio access network (RAN). Another benefit may be that a PDSN 418 may be shared across QoS aware/unaware RANs.

Figure 8:
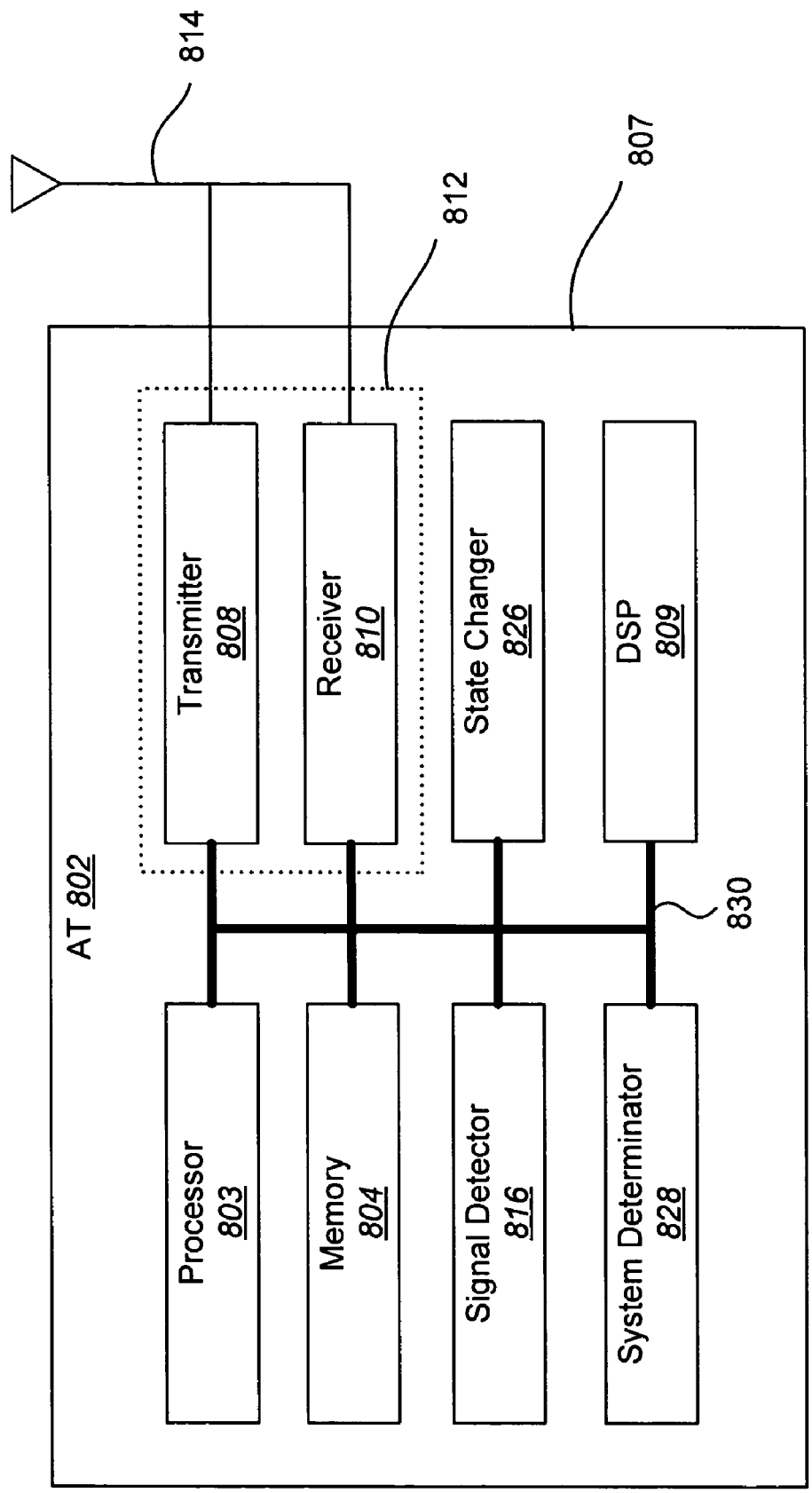
FIG. 8 illustrates various components that may be utilized in an access terminal in accordance with an embodiment.

FIG. 8 illustrates various components that may be utilized in an access terminal 802 in accordance with an embodiment. The access terminal 802 includes a processor 803 which controls operation of the access terminal 802. The processor 803 may also be referred to as a CPU. Memory 804, which may include both read-only memory (ROM) and random access memory (RAM), provides instructions and data to the processor 803. A portion of the memory 804 may also include non-volatile random access memory (NVRAM).

The access terminal 802 may also include a housing 807 that contains a transmitter 808 and a receiver 810 to allow transmission and reception of data between the access terminal 802 and a remote location. The transmitter 808 and receiver 810 may be combined into a transceiver 812. An antenna 814 is attached to the housing 807 and electrically coupled to the transceiver 812.

The access terminal 802 also includes a signal detector 816 used to detect and quantify the level of signals received by the transceiver 812. The signal detector 816 detects such signals as total energy, pilot energy per pseudonoise (PN) chips, power spectral density, and other signals, as is known in the art.

A state changer 826 of the access terminal 802 controls the state of the access terminal 802 based on a current state and additional signals received by the transceiver 812 and detected by the signal detector 816. The access terminal 802 is capable of operating in any one of a number of states. The access terminal 802 also includes a system determinator 828 used to control the access terminal 802 and determine which service provider system the access terminal 802 should transfer to when it determines the current service provider system is inadequate.

The various components of the access terminal 802 are coupled together by a bus system 830 which may include a power bus, a control signal bus, and a status signal bus in addition to a data bus. However, for the sake of clarity, the various busses are illustrated in FIG. 8 as the bus system 830. The access terminal 802 may also include a digital signal processor (DSP) 809 for use in processing signals.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present disclosure. In other words, unless a specific order of steps or actions is required for proper operation of the embodiment, the order and/or use of specific steps and/or actions may be modified without departing from the scope of the present disclosure.

While specific embodiments and applications of the present disclosure have been illustrated and described, it is to be understood that the disclosure is not limited to the precise configuration and components disclosed herein. Various modifications, changes, and variations which will be apparent to those skilled in the art may be made in the arrangement, operation, and details of the methods and systems of the present disclosure disclosed herein without departing from the spirit and scope of the disclosure.

What is claimed is:

1. A method for managing quality of service (QoS) resources, the method comprising:
   with an access terminal, during a handoff from a QoS unaware system to a QoS aware system, said QoS aware system having been previously accessed by the access terminal:
   determining whether there are any allocated, unrequested QoS resources that remain allocated to an application on the access terminal by the QoS aware system but that are not currently requested by the application;
   if one or more allocated, unrequested QoS resources are identified, requesting that the QoS aware system release the one or more allocated, unrequested QoS resources; and
   in response to a determination that one or more requested, unallocated QoS resources are requested by the application but that are not allocated by the QoS aware system and that a point-to-point protocol (PPP) re-sync has not occurred since the access terminal was previously connected to the QoS aware system, requesting that the QoS aware system allocate the one or more requested, unallocated QoS resources to the application.

2. The method of claim 1, wherein at least one of determining whether there are any allocated, unrequested QoS resources and/or determining whether there are any requested, unallocated QoS resources comprise comparing requested QoS resources information with allocated QoS resources information.

3. The method of claim 2, wherein the requested QoS resources information identifies requested QoS resources that are requested by an application on the access terminal.

4. The method of claim 2, wherein the allocated QoS resources information identifies allocated QoS resources that are allocated for the application.

5. The method of claim 2, wherein the requested QoS resources information and the allocated QoS resources information are stored at the access terminal.

6. The method of claim 1, further comprising updating requested QoS resources information in response to determining that the application has released requested QoS resources.

7. The method of claim 1, further comprising updating allocated QoS resources information in response to determining that the QoS aware system has released allocated QoS resources.

8. The method of claim 1, wherein requesting that the QoS aware system release the one or more allocated, unrequested QoS resources comprises sending a traffic filter template (TFT) delete message to a packet data serving node in the QoS aware system.

9. The method of claim 1, wherein requesting that the QoS aware system allocate the one or more requested, unallocated QoS resources comprises sending a traffic filter template (TFT) create message to a packet data serving node in the QoS aware system.

10. The method of claim 9, wherein the TFT create message is sent to the packet data serving node only if it is determined that a point-to-point protocol (PPP) re-sync has not occurred since the access terminal was previously connected to any QoS aware system.

11. The method of claim 1, further comprising notifying the application that QoS operations may be resumed in response to determining that the handoff has occurred from a QoS unaware system to the QoS aware system.

12. The method of claim 1, further comprising suspending all QoS flows in response to determining that the handoff has occurred from the QoS aware system to a QoS unaware system.

13. An access terminal comprising:
a transmitter capable of communicating with a quality of service (QoS) aware system and a QoS unaware system;
a processor;
memory in electronic communication with the processor; and
instructions stored in the memory, the instructions being executable by the processor as during a handoff from the QoS unaware system to the QoS aware system, said QoS aware system having been previously accessed by the access terminal, to:
 determine whether there are any allocated, unrequested QoS resources that remain allocated to an application on the access terminal by the QoS aware system but that are not currently requested by the application;
 if one or more allocated, unrequested QoS resources are identified, request that the QoS aware system release the one or more allocated, unrequested QoS resources; and
 in response to a determination that one or more requested, unallocated QoS resources are requested by the application but that are not allocated by the QoS aware system and that a point-to-point protocol (PPP) re-sync has not occurred since the access terminal was previously connected to the QoS aware system, request that the QoS aware system allocate the one or more requested, unallocated QoS resources to the application.

14. The access terminal of claim 13, wherein requesting that the QoS aware system release the one or more allocated, unrequested QoS resources comprises sending a traffic filter template (TFT) delete message to a packet data serving node in the QoS aware system.

15. The access terminal of claim 13, wherein requesting that the QoS aware system allocate the one or more requested, unallocated QoS resources comprises sending a traffic filter template (TFT) create message to a packet data serving node in the QoS aware system.

16. The access terminal of claim 15, wherein the TFT create message is sent to the packet data serving node only if it is determined that a PPP re-sync has not occurred since the access terminal was previously connected to any QoS aware system.

17. The access terminal of claim 13, wherein the instructions are further executable to notify the application that QoS operations may be resumed in response to determining that the handoff has occurred from the QoS unaware system to the QoS aware system.

18. The access terminal of claim 13, wherein the instructions are further executable to suspend all QoS flows in response to determining that the handoff has occurred from the QoS aware system to the QoS unaware system.

19. An access terminal comprising:
means for communicating with a quality of service (QoS) aware system and a QoS unaware system;
means for determining during a handoff from the QoS unaware system to the QoS aware system, said QoS aware system having been previously accessed by the access terminal, whether there are any allocated, unrequested QoS resources that remain allocated to an application on the access terminal by the QoS aware system but that are not currently requested by the application;
means for requesting the QoS aware system to release the one or more allocated, unrequested QoS resources if one or more allocated, unrequested QoS resources are identified;
means for determining whether one or more requested, unallocated QoS resources are requested by the application but that are not allocated by the QoS aware system and that a point-to-point protocol (PPP) re-sync has not occurred since the access terminal was previously connected to the QoS aware system; and
means for requesting that the QoS aware system allocate the one or more requested, unallocated QoS resources to the application.

20. An article comprising:
one or more memory devices having computer implementable instructions stored thereon which are executable by one or more processors in an access terminal to:
 manage quality of service (QoS) resources during a handoff from a QoS unaware system to a QoS aware system, said QoS aware system having been previously accessed by the access terminal, by:
  determining whether there are any allocated, unrequested QoS resources that remain allocated to an application on the access terminal by the QoS aware system but that are not currently requested by the application;

if one or more allocated, unrequested QoS resources are identified, requesting that the QoS aware system release the one or more allocated, unrequested QoS resources; and in response to a determination that one or more requested, unallocated QoS resources are requested by the application but that are not allocated by the QoS aware system and that a point-to-point protocol (PPP) re-sync has not occurred since the access terminal was previously connected to the QoS aware system, request that the QoS aware system allocate the one or more requested, unallocated QoS resources to the application.

21. The article of claim 20, wherein the computer implementable instructions are further executable by the one or more processors to:

identify the allocated, unrequested QoS resources and/or identify the requested, unallocated QoS resources by comparing requested QoS resources information with allocated QoS resources information.

22. The article of claim 21, wherein the requested QoS resources information identifies requested QoS resources that are requested by an application on the access terminal.

23. The article of claim 21, wherein the allocated QoS resources information identifies allocated QoS resources that are allocated for the application.

24. The article of claim 21, wherein the requested QoS resources information and the allocated QoS resources information are stored at the access terminal.

25. The article of claim 20, wherein the computer implementable instructions are further executable by the one or more processors to update requested QoS resources information in response to determining that the application has released requested QoS resources.

26. The article of claim 20, wherein the computer implementable instructions are further executable by the one or more processors to update allocated QoS resources information in response to determining that the QoS aware system has released allocated QoS resources.

27. The article of claim 20, wherein the computer implementable instructions are further executable by the one or more processors to send a traffic filter template (TFT) delete message to a packet data serving node in the QoS aware system.

28. The article of claim 20, wherein the computer implementable instructions are further executable by the one or more processors to send a traffic filter template (TFT) create message to a packet data serving node in the QoS aware system.

29. The article of claim 28, wherein the TFT create message is sent to the packet data serving node only if it is determined that a point-to-point protocol (PPP) re-sync has not occurred since the access terminal was previously connected to any QoS aware system.

30. The article of claim 20, wherein the computer implementable instructions are further executable by the one or more processors to notify the application that QoS operations may be resumed in response to determining that handoff has occurred from a QoS unaware system to the QoS aware system.

31. The article of claim 20, wherein the computer implementable instructions are further executable by the one or more processors to suspend all QoS flows in response to determining that handoff has occurred from the QoS aware system to a QoS unaware system.

* * * * *